United States Patent [19]

Tefft

[11] Patent Number: 4,786,364
[45] Date of Patent: Nov. 22, 1988

[54] DMDAAC/AM COPOLYMERS AS DEINKERS

[75] Inventor: Edwin R. Tefft, Pittsburgh, Pa.

[73] Assignee: Calgon Corporation, Pittsburgh, Pa.

[21] Appl. No.: 637,236

[22] Filed: Aug. 2, 1984

[51] Int. Cl.$^4$ .............................................. D21C 5/02
[52] U.S. Cl. ................................................... 162/5
[58] Field of Search ..................... 162/5, 168.3, 168.4

[56] References Cited

U.S. PATENT DOCUMENTS 3,639,208  2/1972  Varveri et al. ................... 162/168.4

FOREIGN PATENT DOCUMENTS 694471    9/1964  Canada ..................................... 162/5
54-23705  2/1979  Japan ...................................... 162/5

Primary Examiner—Kenneth M. Schor
Assistant Examiner—K. M. Hastings
Attorney, Agent, or Firm—W. C. Mitchell; M. C. Sudol

[57] ABSTRACT

The instant invention is directed to a method for deinking cellulosic fibrous material impregnated with ink wherein a mixture of said material and water is stirred in the presence of a deinking agent, the improvement wherein the deinking agent is a hydrolyzed copolymer of dimethyldiallyl ammonium chloride and acrylamide.

5 Claims, No Drawings

DMDAAC/AM COPOLYMERS AS DEINKERS

BACKGROUND OF THE INVENTION

In a typical deinking process, waste newsprint is introduced into an aqueous bath, which may or may not be alkaline, to which has been added, as a deinking agent, a surface active agent or detergent. The waste newsprint becomes defibered in the bath, and the ink is removed from the fibers by the detergent. The resulting slurry is composed of substantially deinked newsprint fibers, water, and the detergent and ink particles. The slurry is rinsed, liquid is drained from the slurry, and the resulting thickened pulp is recycled into sheets of paper by conventional processing procedures well known to those skilled in the papermaking art.

The effectiveness of the deinking agent is determined by the brightness of the resulting paper sheets. Brightness is determined by a conventional test, and is expressed as a brightness number. The higher the number, the better the brightness.

DESCRIPTION OF THE INVENTION

The instant invention is directed to a method for deinking cellulosic fibrous material impregnated with ink wherein a mixture of said material and water is stirred in the presence of a deinking agent, the improvement wherein said deinking agent is a hydrolyzed copolymer of dimethyldiallyl ammonium chloride and acrylamide.

The deinking agents are used in a solution in substantially aqueous media.

The temperature of the deinking solution may vary anywhere from room temperature, e.g., 40° to 70° F., up to about 200° F.

In preparing the deinking solution, water is charged to the reactor or pulper according to industry standards. The deinking agent is preferably added to the water prior to the addition of the waste paper or the waste.

Descriptions of the deinking process are described in U.S. Pat. Nos. 3,501,373; 3,932,206; 3,986,922; 4,162,186; and 4,311,552, which are hereby incorporated by reference. The ratio of dimethyldiallyl ammonium chloride to acrylamide is not critical. The molecular weight of the copolymer also is not critical.

Some diethyldiallyl ammonium chloride (DEDAAC) may be substituted for some of the dimethyldiallyl ammonium chloride (DMDAAC), preferably less than 5%.

Although any weight ratio of acrylamide (AM) to DMDAAC (and optionally DEDAAC) may be used, the preferred ratio is 75:25 to 25:75, most preferably 55:45 to 45:55.

The preferred molecular weight of the copolymer is 2,000,000 to 10,000,000 as determined by gel permeation chromatography.

Although any amount of the copolymer may be used, it is preferred to use 0.01 to 0.1%, most preferably 0.04 to 0.06% by weight, active of the copolymer, based on the dry paper weight.

The copolymer is hydrolyzed preferably about 4 to 5%. The acrylamide is hydrolyzed to acrylic acid.

EXAMPLES

The deinker of the instant invention was evaluated according to Tappi useful method 233, "Deinkability of High Ground Wood Waste Paper", which is hereby incorporated by reference.

10 Grams of waste paper were torn into approximately 1 inch squares. 10 Milliliters of a 0.05%, by weight, active solution of dimethyldiallyl ammonium chloride/acrylamide copolymer (based on the weight of the dry paper), 0.025 grams sodium tripolyphosphate, and 0.15 grams of sodium metasilicate were mixed with the paper in 250 milliliters of warm water (at about 130° F.). The temperature was maintained for 10 minutes. The mixture was stirred at high speed for 30 seconds. After the first 10 seconds of stirring, the paper was loosened and stirred for an additional 20 seconds. The suspension was drained on a sieve and washed; the pulp was stirred into 500 milliliters of fresh cold water using a stirring rod and drained again on the sieve and repeated twice more. The washed pulp was stirred into 1000 milliliters of fresh coldwater using a stirring rod. A handsheet was made on a sheet machine from 400 ml of the pulp solution, by draining 400 ml of the pulp suspension on a sieve, adding 100 ml of 165° F. water and placed in a hot water bath maintained at approximately 165° F. Then 0.08 grams of zinc hydrosulfite were added, stirred for 10 seconds and left to stand without agitation for about 15 minutes while maintaining the temperature. A handsheet was then made of the decolorized pulp. The brightness of the handsheet was then obtained on a Tappi standard brightness meter using Tappi standard T-452. The results are summarized in the Table.

TABLE

| Additive | Average Brightness | |
|---|---|---|
| | Unbleached | bleached |
| none | 44.8 | 51.3 |
| DMDAAC/AM[1] | 46.9 | 54.3 |

[1]DMDAAC/AM = dimethyldiallyl ammonium chloride/acrylamide copolymer

What is claimed is:

1. In a method for deinking cellulosic fibrous material impregnated with ink wherein a mixture of said material and water is stirred in the presence of a deinking agent, the improvement wherein said deinking agent is a hydrolyzed copolymer of dimethyldiallyl ammonium chloride and acrylamide, wherein the molecular weight of said copolymer is 2,000,000 to 10,000,000 as determined by gel permeation chromatography, and wherein 0.01 to 0.1%, by weight, of said copolymer is used, based on a dry paper weight.

2. The method of claim 1, wherein said hydrolyzed copolymer also is prepared from up to 5%, by weight, diethyldiallyl ammonium chloride.

3. The method of claim 1, wherein 4 to 5%, by weight, of said acrylamide is hydrolyzed to acrylic acid.

4. The method of claim 1, wherein the weight ratio of acrylamide to dimethyldiallyl ammonium chloride is 75:25 to 25:75.

5. The method of claim 4, wherein the weight ratio of acrylamide to dimethyldiallyl ammonium chloride is 55:45 to 45:55.

* * * * *